United States Patent
Choi

(10) Patent No.: US 6,600,728 B1
(45) Date of Patent: Jul. 29, 2003

(54) PICO-CELL INDICATOR AND A METHOD FOR CELL REGISTRATION OF MOBILE TERMINAL BY USING THE PICO-CELL INDICATOR

(75) Inventor: Sung-Gyu Choi, Kyonggi-do (KR)

(73) Assignee: Hyundai Electronics Industries Co., Ltd., Kyonggi-Do (KR)

( * ) Notice: Subject to any disclaimer, the term of this patent is extended or adjusted under 35 U.S.C. 154(b) by 0 days.

(21) Appl. No.: 09/221,530

(22) Filed: Dec. 28, 1998

(30) Foreign Application Priority Data

Dec. 31, 1997 (KR) .............................. 97-80903

(51) Int. Cl.$^7$ .............................................. H04B 7/216
(52) U.S. Cl. ........................ 370/335; 370/342; 370/444
(58) Field of Search ................................ 370/335, 342, 370/329, 331, 336, 337; 455/444, 435

(56) References Cited

U.S. PATENT DOCUMENTS 5,629,975 A  *  5/1997  Tiedemann, Jr. ............ 370/360
6,101,176 A  *  8/2000  Honkasalo .................. 370/335
6,278,883 B1 *  8/2001  Choi .......................... 455/552
6,359,868 B1 *  3/2002  Chen .......................... 370/335
6,366,566 B1 *  4/2002  Scott .......................... 370/280

* cited by examiner

Primary Examiner—Chau Nguyen
Assistant Examiner—Soon-Dong Hyun
(74) Attorney, Agent, or Firm—J. Harold Nissen; Lackenbach, Siegel

(57) ABSTRACT

In a mobile communication system of multi-cell environment, a pico-cell indicator is installed at predetermined positions for easy cell-registration change of a mobile station from a micro-cell service area to a pico-cell service area. The method for cell registration of the mobile terminal by using the pico-cell indicator includes the steps of determining whether a code signal of the pico-cell indicator is received when the mobile terminal is not in engaged, determining whether a timer in the mobile terminal is in operation when the code signal is input, storing a current micro-cell ID and registering pico-cell when the timer is not in operation, preparing to micro-cell ID when the timer is in operation to register the micro-cell as the operation of the timer is finished, determining whether a code signal is received when the mobile terminal is in engaged in the first step, determining whether the engagement is finished when the code signal is input, and setting timer and storing micro-cell ID when the engagement is finished and registering the pico-cell as the operation of the timer is finished.

2 Claims, 3 Drawing Sheets

PICO-CELL INDICATOR AND A METHOD FOR CELL REGISTRATION OF MOBILE TERMINAL BY USING THE PICO-CELL INDICATOR

BACKGROUND OF THE INVENTION

1. Field of the Invention

The present invention relates to a pico-cell indicator to be installed at predetermined positions for easy cell-registration in case that a mobile station is moving from a micro-cell service area to a pico-cell service area and a method for cell registration of mobile station by using the pico-cell indicator according to a certain code signal which is generated in the pico-cell indicator.

2. Description of the Conventional Art

In general, in order to increase traffic capacity in a service area, a cell, which is in a service area, is divided into mega-cells, the mega-cells are divided into macro-cells, the macro-cells are divided into micro-cells and the micro-cells are divided into pico-cells, so that it becomes possible to easily provide communication service even in a densely populated area or a high building.

When a mobile terminal shifts between the service areas, the service is maintained by registration-change from a current registered cell into a larger cell, as the number of registration event which generates per a unit time period exceeds a predetermined frequency. On the other hand, the service is maintained by registration-change from a current registered cell into a smaller cell, as the number of registration event which generates per a unit time period is short of the predetermined frequency.

For example, if a user enters a building, the service area is changed from the micro-cell to the pico-cell and at this time, the time for changing the service area should be minimized in order to prevent waste the source of the system.

However, the conventional technique has a disadvantage that such a change of service areas takes a certain time necessarily and is not performed at the same time with the shift of the mobile terminal between the service areas, thereby resulting in the waste of wireless sources.

SUMMARY OF THE INVENTION

The present invention is derived to resolve the disadvantages of the conventional techniques, and it is an object of the present invention to provide a pico-cell indicator and a method for cell registration of mobile station by using the pico-cell indicator, wherein the pico-cell indicators are installed at the entrances of buildings or parking lots to transmit a certain key signal representing pico-cell with a predetermined time interval and a terminal of a mobile communication system receives the signal to change the registration of service area of the mobile system from a micro-cell to a pico-cell rapidly, so that phasing area is minimized to effectively use the system and the waste of the wireless sources is prevented.

In order to achieve the above objects of the present invention, according to one aspect of the present invention, a pico-cell indicator includes a means for generating a predetermined code signal for indicating pico-cell, a modulator for modulating the code signal output from the code signal generating means into pseudo noise PN code for code division multiple access CDMA communication, a mixer for mixing the PN code which is modulated by the modulator with a carrier signal which is output from a local oscillator, and an RF transmitting means for transmitting the mixed signal output from the mixer through an antenna after converting the mixed signal into an RF signal.

Also, according to another aspect of the present invention, a method for cell registration of a mobile terminal by using a pico-cell indicator includes the steps of determining whether a code signal of the pico-cell indicator is received when the mobile terminal is not engaged, determining whether a timer in the mobile terminal is in operation when the code signal of the pico-cell indicator is input by the mobile terminal, storing a current micro-cell ID and registering the pico-cell when the timer is not in operation, preparing the micro-cell ID which is registered before the pico-cell when the timer is in operation and registering the micro-cell as the operation of the timer is finished, determining whether a code signal from the pico-cell indicator is received when the mobile terminal is engaged in the first step, determining whether the engagement is finished by determining when the code signal is input by the mobile terminal, and setting the timer and storing the micro-cell when the engagement is finished and registering the pico-cell as the operation of the time, is finished.

BRIEF DESCRIPTION OF THE DRAWINGS

The present invention will become more fully understood from the detailed description given hereinbelow with reference to the accompanying drawings which are given by way of illustration only, and thus are not limitative of the present invention, and wherein.

DETAILED DESCRIPTION OF THE INVENTION

Now, a pico-cell indicator and a method for cell registration of a mobile terminal by using the pico-cell indicator will be described hereinbelow with reference to the accompanying drawings.

Figure 1:
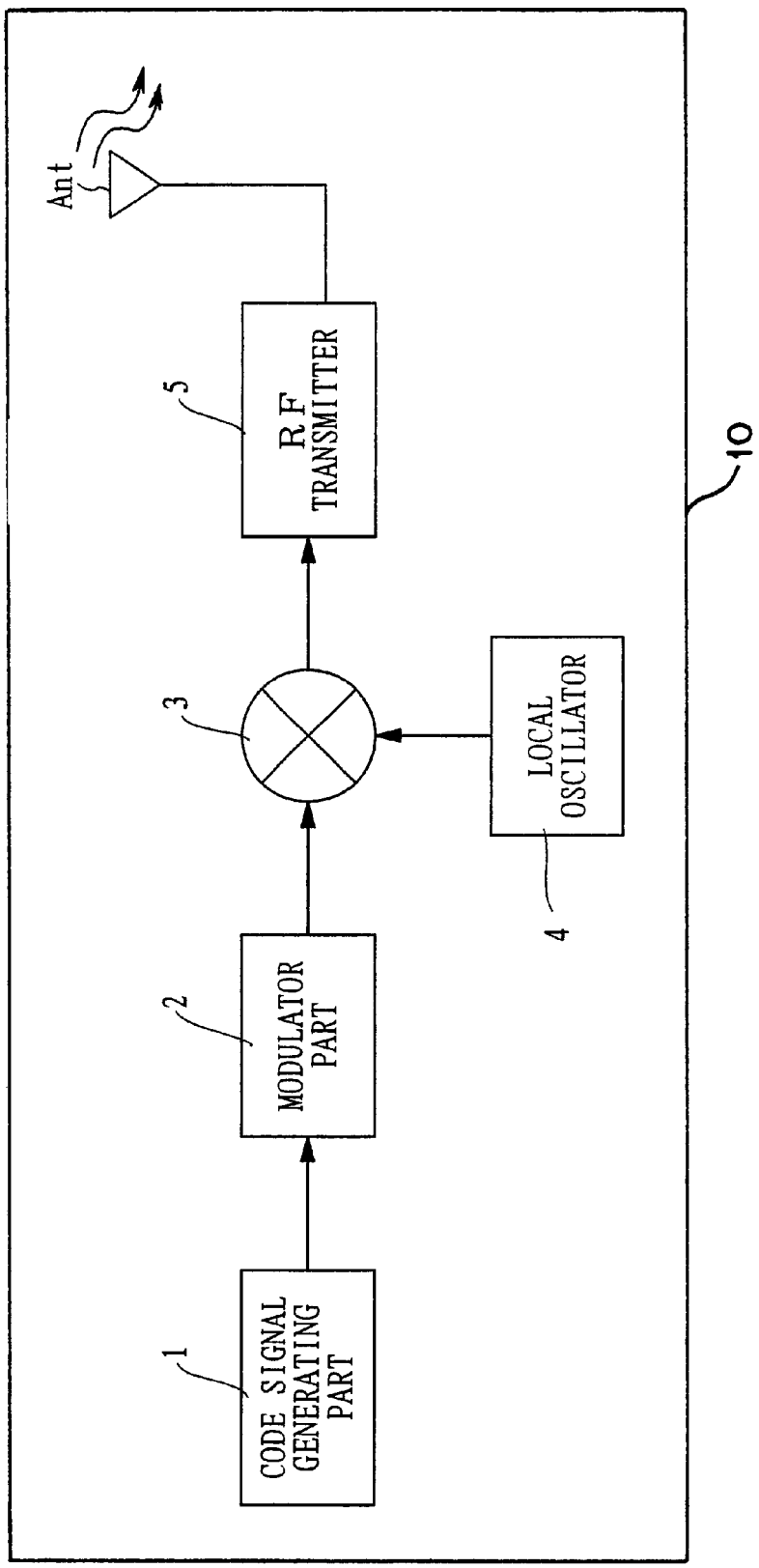
FIG. 1 is a block diagram of a pico-cell indicator according to the present invention.

FIG. 1 is a block diagram of a pico-cell indicator according to the present invention. In FIG. 1, a pico-cell indicator 10 includes a code signal generating part 1 for generating a predetermined code signal for indicating pico-cell, a modulator part 2 for modulating the code signal, which is output from the code signal generating part 1, into a PN code for CDMA communication, a mixer part 3 for mixing the PN code which is modulated by the modulator part 2 with a carrier signal which is output from a local oscillator part 4, and an RF transmitting part 5 for transmitting the mixed signal output from the mixer part 3 to outside through an antenna Ant after converting the mixed signal into an RF signal.

The code signal generating part 1 of the pico-cell indicator 10 outputs one of a kind of Hardmard codes with a predetermined time interval.

The pico-cell indicator 10 is installed at an upper position of an entrance of a building or a parking lot in a corresponding area and generates RF signals from the upper part of the entrance in a downward direction by means of a directional antenna.

When a mobile terminal receives the code for the pico-cell indicator, the mobile terminal registers the pico-cell.

Figure 2:
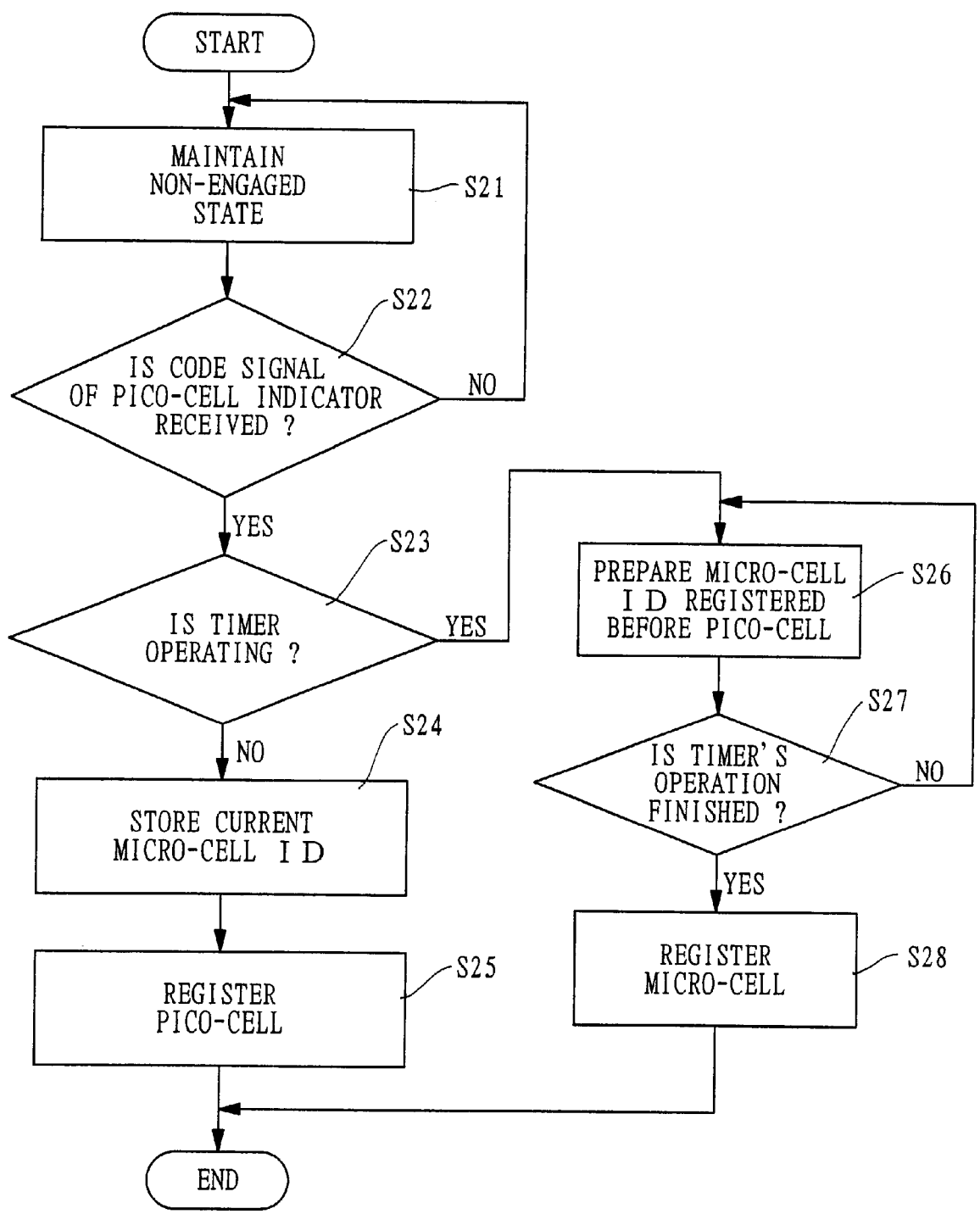
FIG. 2 is a flow chart illustrating a method for cell registration by using the pico-cell under the unengaged state, according to the present invention.
Figure 3:
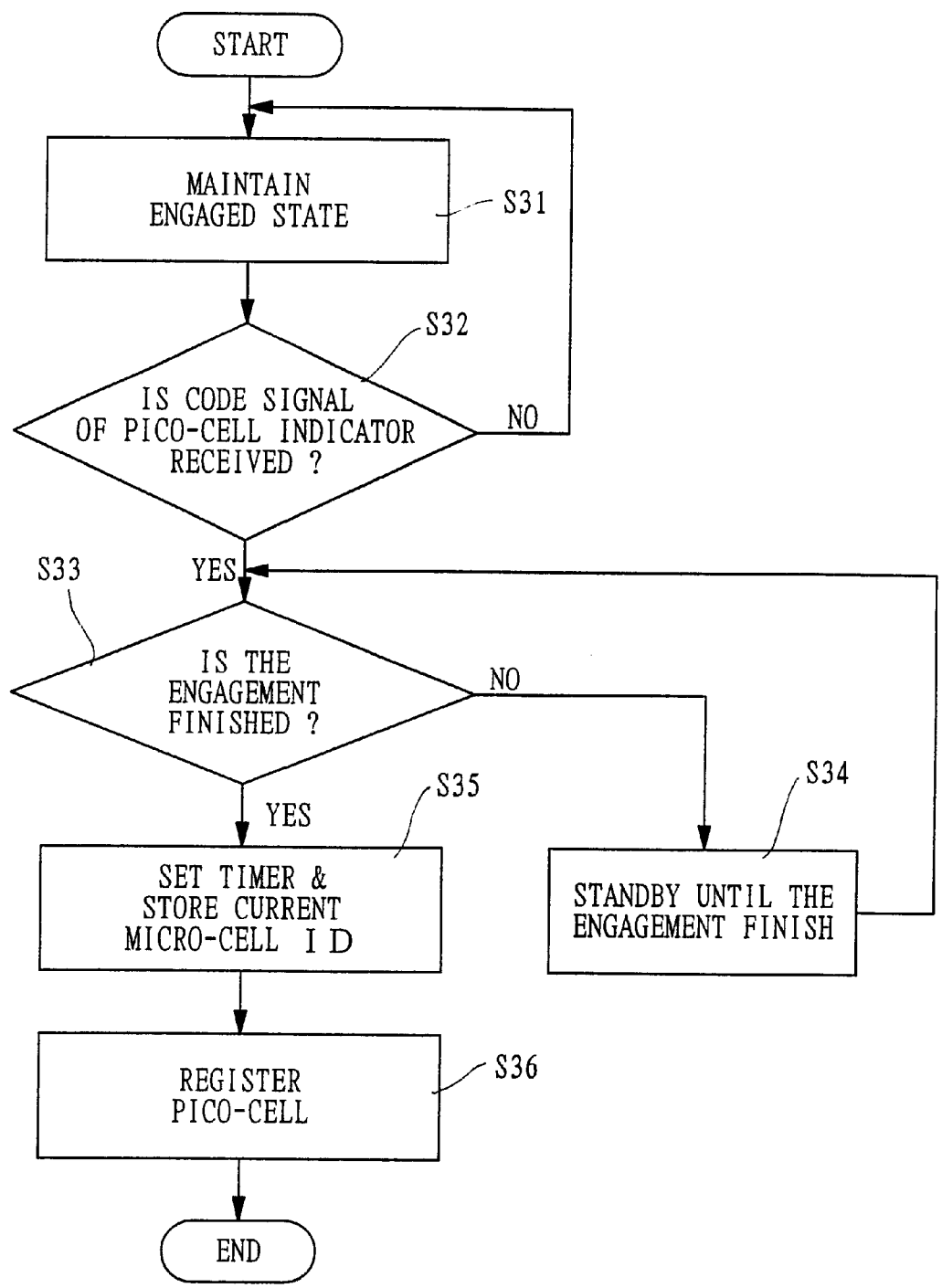
FIG. 3 is a flow chart illustrating a method for cell registration by using the pico-cell under the engaged state, according to the present invention.

Now, referring to the flow charts of FIG. 2 and FIG. 3, the pico-cell indicator and a method for cell registration of a mobile terminal by using the pico-cell indicator are explained in detail.

When the code generating part 1 of the pico-cell indicator 10 generates a predetermined code signal representing pico-cell, the modulator part 2 modulates the code which is generated in the code signal generating part 1 into a PN code for CDMA communication.

The PN code which is modulated by the modulator part 2 is mixed with a carrier signal, which is output from the local oscillator 4, in the mixer 3, and converted into an RF signal in the RF transmitter 5, thereby providing outside by means of the antenna Ant.

Therefore, when a user enters a building or parks his car in a parking lot, the pico-cell indicator 10, which is installed at the entrance of the building or the parking lot, outputs the code signal to be received by a mobile terminal of the user.

At this time, the cell registration of the mobile terminal is performed differently depending on engaged/non-engaged state of the mobile terminal.

The cell registration in case of the non-engaged situation will be described with reference to FIG. 2.

In FIG. 2, if the mobile terminal, which receives the code signal output from the pico-cell indicator 10, is not engaged, it is determined whether the code signal of the pico-cell indicator 10 is received when the mobile terminal is not [in] engaged (S22).

When the code signal of the pico-cell indicator 10 is input by the mobile terminal, it is determined whether a timer in the mobile terminal is in operation (S23). The operation of the timer is detected in order to prevent repetition of the pico-cell registration in the mobile terminal in case that the timer is in operation, since the timer begins to operate from the registration of the pico-cell.

If it is determined that the timer is not in operation in the step S23, the mobile terminal stores a current micro-cell identifier ID (S24) and performs the registration of the pico-cell according to the code signal of the pico-cell indicator 10, which is input in the step S22, so that to change the service area from micro-cell into the pico-cell (in case that the current service is the micro-cell) (S25).

However, if it is determined that the timer is in operation in the step S23, that is, a user comes out back from a building, the micro-cell ID which has been registered before the pico-cell is prepared again (S26). As the operation of the timer is finished, the mobile terminal performs the micro-cell registration (S27 & S28).

Now, the cell registration in case of the engaged situation is described with reference to FIG. 3.

When the mobile terminal is engaged, it is determined whether the code signal of the pico-cell indicator is received (S32). If the mobile terminal does not receive the code signal, the engaged situation is maintained continuously.

On the other hand, if it is determined that the code signal of the pico-cell indicator 10 is input by the mobile terminal in the step S32, it is determined whether the engagement is finished (S33).

If the engagement is not finished, the mobile terminal stands by until the engagement is finished (S34).

As the engagement is finished, the timer is set and the current micro-cell ID is stored (S35). Then, the mobile terminal performs the registration according to the code signal output from the pico-cell indicator 10, thereby changing the registration from the micro-cell to the pico-cell (S36).

EFFECT OF THE INVENTION

As described hereinabove, the pico-cell indicators are installed at the entrances of buildings or parking lots to transmit a certain key signal representing pico-cell with a predetermined time interval and a terminal of a mobile communication system receives the signal to change the registration of service area of the mobile system from a macro-cell or micro-cell to a pico-cell rapidly, so that phasing area is minimized to effectively use the system and the waste of the wireless sources is prevented.

What is claimed is:

1. In a mobile communication system of multi-cell environment, a method for cell registration of a mobile terminal by using a pico-cell indicator comprising the steps of:

determining whether a code signal from the pico-cell indicator representing the pico cell indicator is received by the user of the mobile terminal when the mobile terminal is not engaged:

when the code signal of the pico-cell indicator is input by the mobile terminal it is determined whether a timer in the mobile terminal is in operation to prevent repetition of the registration of the pico-cell in the mobile terminal when the timer is in operation;

storing a current micro-cell ID by the mobile terminal and registering as the timer begins to operate the pico-cell from the registration of the pico-cell when the timer is not in operation; and preparing the micro-cell ID which was previously registered before the pico-cell is registered again after determining that the timer is in operation and registering the micro-cell as the operation of the timer is finished.

2. In a mobile communication system of multi-cell environment, a method for cell registration of a mobile terminal by using a pico-cell environment, a method for cell registration of a mobile terminal by using a pico-cell indicator comprising the steps of:

determining, at the time the mobile terminal is engaged, whether a code signal of the pico-cell indicator is received;

determining if the code signal of the pico-signal indicator is input by the mobile terminal, then it is determined that the mobile terminal is not engaged and engagement is finished;

keeping standby until the engagement is finished when the engagement is not finished; and as the engagement is finished setting timer and storing current micro-cell ID and registering the pico-cell according to the code signal output from the pico cell indicator to change registration from the micro-cell to the pico-cell.

* * * * *